July 17, 1956     R. A. BRAUNBERGER     2,755,104
TRACTOR-TRAILER LOAD DISTRIBUTION ADJUSTING
FIFTH-WHEEL CONSTRUCTION
Filed Dec. 6, 1954     2 Sheets-Sheet 1

INVENTOR.
RAY A. BRAUNBERGER
BY Bruno C. Lechler
Attorney

July 17, 1956  R. A. BRAUNBERGER  2,755,104
TRACTOR-TRAILER LOAD DISTRIBUTION ADJUSTING
FIFTH-WHEEL CONSTRUCTION
Filed Dec. 6, 1954  2 Sheets-Sheet 2

INVENTOR.
RAY A. BRAUNBERGER
BY
Bruno C. Lechler
Attorney

United States Patent Office 2,755,104
Patented July 17, 1956

2,755,104

TRACTOR-TRAILER LOAD DISTRIBUTION ADJUSTING FIFTH-WHEEL CONSTRUCTION

Ray A. Braunberger, Chicago, Ill.

Application December 6, 1954, Serial No. 473,185

4 Claims. (Cl. 280—407)

Since time immemorial the loads carried in a truck have been carried in part by a rear axle and in part by a fifth wheel at the forward end of the truck that transmits that part of the load to a unit that can turn about the axis of the fifth wheel to determine the path along which the vehicle is to travel.

In the horse drawn vehicle the fifth wheel was supported on the forward axle assembly; in the semi-trailer the fifth wheel is supported on a motor driven tractor that has its own rear axle through which the tractor is driven forward and front wheels used in steering. But always the distance from the rear axle to the unit that turns in steering was fixed.

The load carried by the semi-trailer is carried in part by the rear axle of the semi-trailer, in part by the tractor. The rear axle of the tractor and the front wheels of the tractor divide this latter portion of the weight of the semi-trailer in proportions that are dependent on the axial position of the fifth wheel relative to the rear axle and the front axle of the tractor.

In existing tractor driven semi-trailers the total load on the rear axle of the tractor, comprising part of the load on the semi-trailer and a substantial portion of the weight of the tractor and its engine, is apt to be greater than the load on the rear axle of the semi-trailer or on the front wheels of the tractor.

Tractor drawn semi-trailers frequently pass through several states. The semi-trailer on a long trip may be transferred from one tractor to another. For economy of operation the semi-trailer is designed to carry as large a load as possible. The largest possible load is determined by the maximum wheel load permissible under state law. Even though a semi-trailer has been loaded so that the loads on the various axles do not exceed the limits allowed by the laws of the state where the load originates, it frequently happens that in passing into another state, with different load restrictions, the load on the rear tractor axle is slightly larger than allowable in that state. This may involve substantial fines, or large costs in unloading and reloading the semi-trailer. The surplus discarded load must be picked up by another truck.

The invention for the first time provides means whereby the relative distribution of the weight of a loaded semi-trailer between the rear axle of the semi-trailer and the axles of the tractor may be changed without unloading the semi-trailer. This is accomplished by moving the fifth wheel which is supporting the forward end of the semi-trailer on the tractor chassis while the semi-trailer is coupled to the tractor.

This is made possible by a novel fifth wheel assembly which, instead of having a fixed axial relation to the rear axle of the tractor, can be moved closer or further away from that rear axle.

Hitherto fifth wheels had a top-plate pivotally supported on two shackles in a manner that allows the fifth wheel plate to tilt backward or forward. Even though some shackles have a slight freedom of movement to allow for jolts or misalignments, essentially each shackle is supported on one of the side beams of the tractor chassis in fixed position.

The invention for the first time provides a fifth wheel whose top-plate is tiltably supported on shackles that can be moved to any one of several selected positions on the chassis and anchored in that position.

The object of the invention is to permit the operators of a tractor drawing a semi-trailer to change the relative portion of the semi-trailer load carried by the rear axle of the tractor by moving the fifth wheel relative to the rear axle of the tractor without uncoupling the semi-trailer.

A further object of the invention is to provide a fifth wheel whoe tiltable top-plate is supported on shackles that can be moved parallel to the axis of the vehicle along guided paths and anchored in selected positions in those paths.

A further object of the invention is to provide a fifth wheel having a bed-plate extending across the chassis of the tractor, parallel grooves in said bed-plate, shackles movable along said grooves, means to anchor the shackles in a selected position in the groove, and a fifth wheel top-plate tiltable on said shackles.

Figure 1:
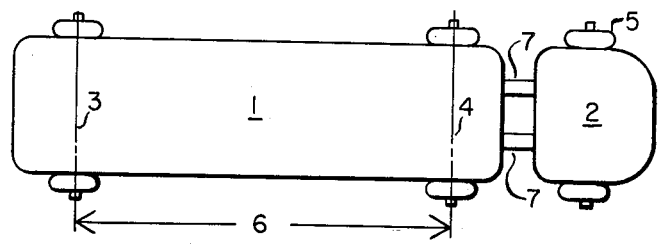
Figure 1 is a plan view of a load carrying vehicle comprising a semi-trailer and a tractor equipped with an adjustable fifth wheel.

In these drawings, 1 represents a semi-trailer, 2 a tractor moving the semi-trailer. The semi-trailer has a rear axle 3; the tractor has its rear axle at 4 and front wheels at 5. The distinctive feature of the invention is that the distance 6 between the axles 3 and 4 can be varied.

The tractor chassis has side beams 7. A base plate 10 generally indicated at 8 is rigidly attached to these beams. The weight of the plate may be lightened by holes 13. The plate 8 has parallel grooves 14 and in each groove a shackle, generally indicated at 15, is mounted. The shackles 15 support the top-plate 16. This top-plate has a slot 17 into which the conventional king pin carried by the semi-trailer enters. After the king pin has reached the forward end of the slot 17 it is locked in place by locking mechanism not shown.

The king pin and the latching mechanism carried by the fifth wheel plate form no part of this invention; they may be of the type shown in my application on a King Pin Lock for Fifth Wheels, filed March 3, 1953 and bearing Serial Number 340,098, now Patent No. 2,736,574.

In the preferred form of the invention the grooves 14 have inwardly extending flanges 18, 19. The base of each shackle 15 has lateral extensions 20 that permit the shackle to slide back and forth in groove 14 but prevent it from being lifted out of the groove. Preferably the groove carries a raised triangular ridge, 21 and the base of the shackle 15 has a mating recess which rides on the tapered sides of this V-shaped ridge.

The shackle may be of the type shown in the pending application entitled, Compression Type Shock Absorbing Bearing for Tilting Plates, filed August 2, 1954, and bearing Serial Number 447,326.

The shackle 15 has a cylindrical head with flanges 22 and the underside of top-plate 16 of the fifth wheel carries a concave surface bearing on the head and having a flange 23. A vertical rib 24 extends down from the top-plate 16 at one side of each shackle. A cap 25 has flanges 26, 27 that engage the flanges 22, 23. Similar flanges at the other side of the shackle are engaged by flanges on rib 24. These flanges prevent the fifth wheel plate lifting off the shackles.

The cap may have a recess 28 into which the head 30 of a bolt 31 may be entered by sliding the bolt 31 through the passage 32. A nut 33 at the other end of bolt 31 permits drawing the cap 25 into place.

At the bottom of each groove 14 are spaced holes 34.

The shackle 15 is hollow, having side walls 35, 36. The shackle also contains a vertical well 37 in which a plunger 38 is free to move. This plunger 38 has lips 40, 41.

The shackle walls 35, 36 support a shaft 42. This shaft has a circular cross section except for the projection 43 near its center. A hexagonal head 44 permits the shaft to be turned by a wrench. The shaft carries an arm 45 having a groove 46 into which the projection 43 fits.

The arm 45 has a finger 47 that engages the lips 40, 41 of the plunger 38.

The arm 45 also has two conical depressions 50, 51. The shackle wall 35 has a hole 52. A washer 63 is firmly fastened into the upper end of hole 52. A conical head 53 is fastened to a rod 54 that extends through the hole in the washer 63 into a knob 55. A compressed spiral spring 56 pressing against the washer 63 and the conical head 53 tends to force the conical head into either hole 50 or 51.

Figure 6:
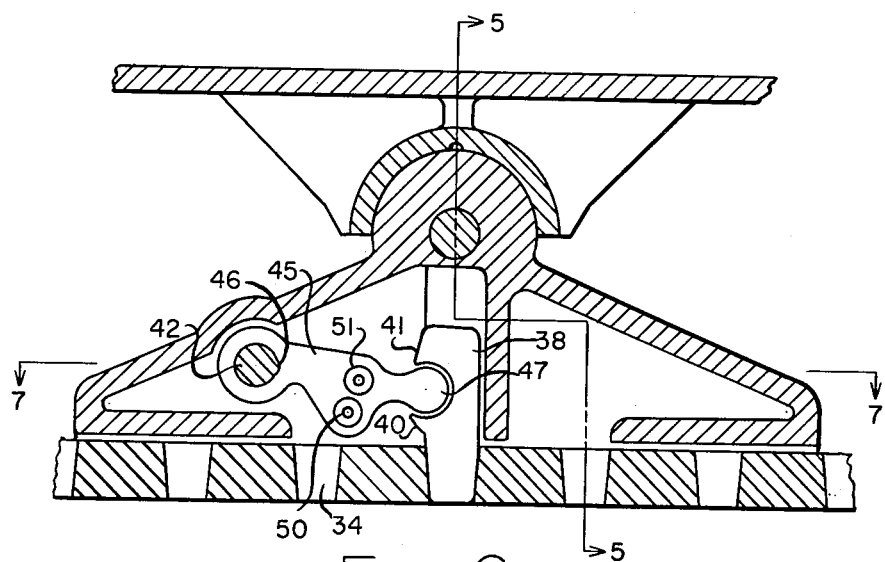
Figure 6 is a vertical section taken along lines 6—6 in Figure 5.
Figure 4:
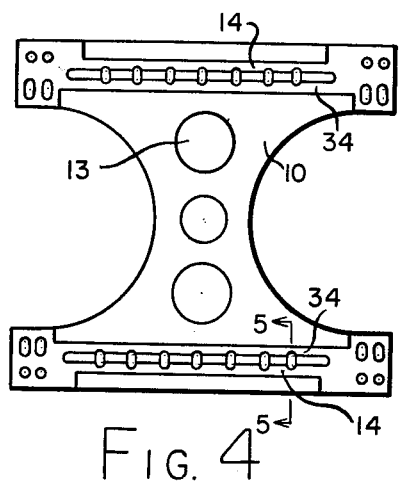
Figure 4 shows in plan, to a larger scale than Figures 2 and 3, the stationary plate mounted on the tractor chassis on which the fifth wheel moves.
Figure 2:
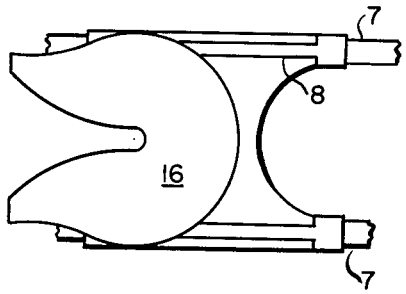
Figure 2 is a plan view, drawn to a large scale, of a portion of the tractor chassis showing the fifth wheel in its rearmost position.
Figure 3:
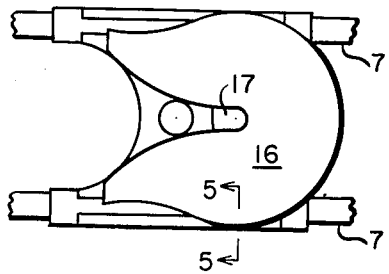
Figure 3 is a plan view similar to Figure 2 but showing the fifth wheel in its forward position.
Figure 7:
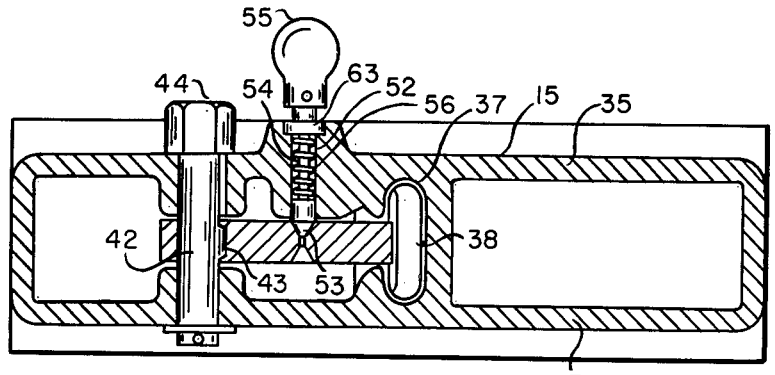
Figure 7 is a horizontal section taken along lines 7—7 in Figure 6.
Figures 5, 8:
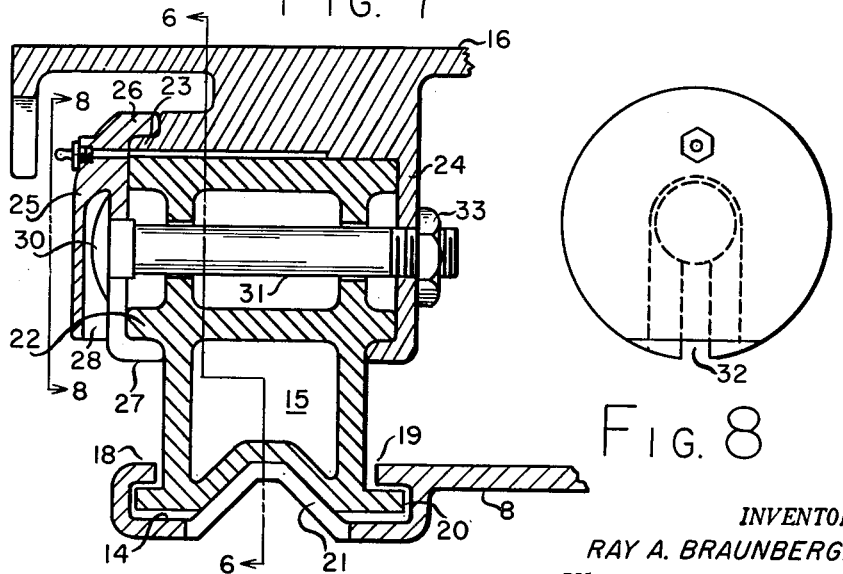
Figure 5 shows in elevation, in a section taken along 5—5 in Figures 3 and 4, to a larger scale, one of the two supports for the fifth wheel plate that slide along a V in the stationary plate shown in Figure 4.
Figure 8 is a side view of the cap taken along lines 8—8 in Figure 5.

In the position shown in Figure 6 the plunger 38 engages a hole 34 in the base plate 8 and the head 53 prevents the plunger 38 leaving the hole.

By pulling back knob 55 and turning head 44 with a wrench, the plunger can be lifted out of the hole 34 and if the knob 55 is now released the head will engage hole 50 and hold the plunger in its elevated disconnected position.

In the operation of the invention, a base plate extending across both side beams of a tractor chassis and having two longitudinal grooves, preferably each containing a raised rib of inverted V section is permanently attached to the chassis.

Two shackles are entered into these grooves. The fifth wheel plate is mounted in the usual manner on the heads of these shackles. The shackles are then anchored in a selected position in the grooves.

The tractor is now backed under a semi-trailer whose king pin enters the slot in the fifth wheel, and having entered, the king pin is locked into place. The conveyance may now be driven over truck scales and the weight on the respective wheels of the tractor determined. If the distribution of the weight of the forward end of the semi-trailer between the tractor wheels is to be altered, the brake is applied to the rear wheels of the semi-trailer, the plunger that is carried by the shackle is lifted up, and locked in its up position. The tractor is now moved slightly, either forward or back. The fifth wheel and the shackles, being locked to the king pin of the stationary semi-trailer, will stand still while the truck chassis slides under the shackles. When the proper position is reached the plunger in each shackle is lowered and entered into a hole in the base casting and locked in that position.

The tractor can now move the semi-trailer over the highways with a different load distribution. It will be noted that as the tractor supplies the force needed to move the bed-plate under the shackles, the problem of how to overcome the large friction due to the heavy load is solved in a novel manner.

I claim:

1. An improved fifth wheel comprising, in combination, a stationary plate extending across a tractor chasis, parallel longitudinal grooves in the upper side of said plate, a ridge forming an inverted V in the center of each groove, flanges extending inward from each side of each groove, in each groove a shackle having a base having a groove that fits over said ridge and outward extensions that extend under said flanges, means to lock each shackle against longitudinal movement on its ridge, a fifth wheel plate tiltably supported on the head of said shackles.

2. An improved fifth wheel comprising, in combination, a stationary plate extending across a tractor chassis, parallel longitudinal grooves in said plate, spaced holes in the bottom of each groove, in each groove a shackle movable along the groove, a vertically movable plunger carried by each shackle, a lever pivotably supported in each shackle that engages said plunger, means to turn said lever about its pivot, means in each shackle adapted to lock the lever either in position to elevate said plunger out of the hole in the groove or in position where the plunger is in said holes in each groove, a fifth wheel plate tiltably supported on said shackles.

3. An improved fifth wheel comprising, in combination, a stationary plate extending across a tractor chassis, parallel longitudinal grooves in said plate, spaced holes in the bottom of each groove, in each groove a hollow shackle movable along the groove, a horizontal shaft extending through said shackle, a horizontal arm keyed to said shaft, a plunger vertically movable in a well in said shackle by said lever, a horizontal bolt extending through one wall of said shackle, spring means to force said bolt against said lever, a hole in said lever adapted to be engaged by said bolt to hold the plunger in a position where it engages a hole in said groove, a second hole in said lever adapted to be engaged by said bolt when the plunger is elevated, a fifth wheel plate tiltably supported on said shackles.

4. A rigid plate for supporting an axially movable fifth wheel on a truck chassis subject to distortion under road strains consisting of a single casting I shaped in plan, the parallel sections each adapted to extend along a channel of a truck chassis, the third section joining said sections being wider than the parallel sections to maintain them in rigid relationship under all conditions, two parallel grooves in said casting to guide the movable fifth wheel, overhanging lips cast on the sides of said grooves to prevent the fifth wheel being jolted out of the grooves, a raised portion in each groove extending longitudinally thereof and forming an inverted V guide for the fifth wheel, and evenly spaced openings in said V guides.

References Cited in the file of this patent

UNITED STATES PATENTS

| | | |
|---|---|---|
| Re. 23,704 | De Lay | Sept. 1, 1953 |
| 2,317,508 | Zoder | Apr. 27, 1943 |
| 2,330,897 | Kirksey | Oct. 5, 1943 |
| 2,682,419 | Wolf | June 29, 1954 |
| 2,697,614 | Smith | Dec. 21, 1954 |
| 2,713,500 | Flynn | July 19, 1955 |

FOREIGN PATENTS

| | | |
|---|---|---|
| 677,022 | France | Dec. 7, 1929 |